April 14, 1959   E. W. GORTER ET AL   2,882,235
METHOD OF MANUFACTURING MAGNETIC CORES
Filed Dec. 20, 1954
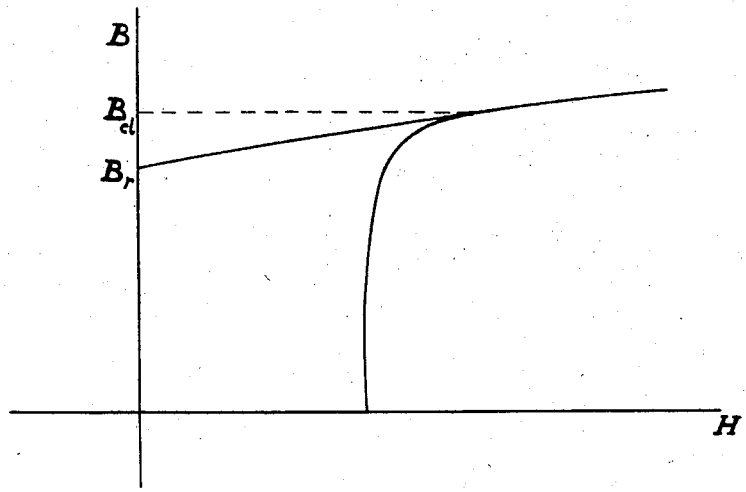
Fig. 1
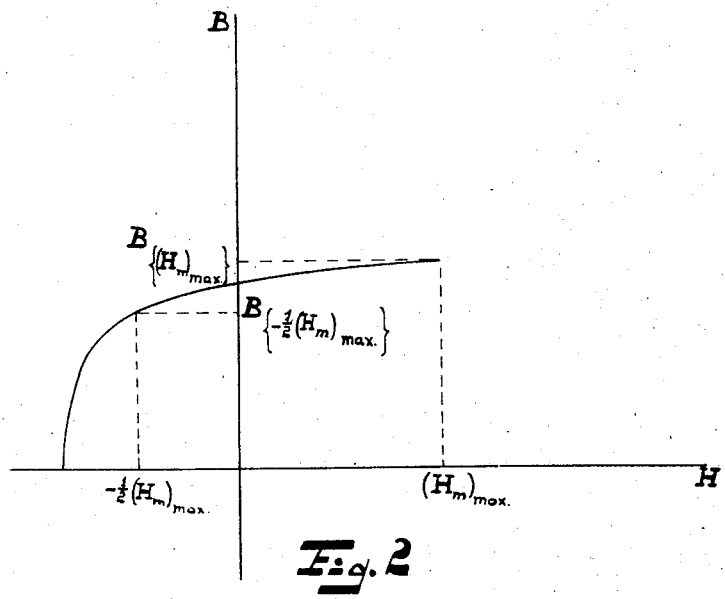
Fig. 2
INVENTORS
EVERT WILLEM GORTER
CORNELIS JACOBUS ESVELDT
BY 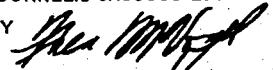
AGENT

United States Patent Office 2,882,235
Patented Apr. 14, 1959

2,882,235

METHOD OF MANUFACTURING MAGNETIC CORES

Evert Willem Gorter and Cornelis Jacobus Esveldt, Emmasingel, Eindhoven, Netherlands, assignors, by mesne assignments, to North American Philips Company, Inc., New York, N.Y., a corporation of Delaware Application December 20, 1954, Serial No. 476,529

Claims priority, application Netherlands December 21, 1953

3 Claims. (Cl. 252—62.5)

Magnetic cores whereof the hysteresis loop approaches the form of a rectangle are of importance for various uses. This type of cores is employed inter alia for so-called "magnetic memories" (for example W. N. Papian, "Proceedings of the I.R.E.," April 1952, pages 475 to 478, and D. R. Brown and E. Albers, Schoenberg, "Electronics," April 1953, pages 146 to 149). Such magnetic memories are used inter alia in counting apparatus and automatic radio compasses. Furthermore such cores are used in magnetic switches.

The invention will be described with reference to the accompanying drawing in which Figs. 1 and 2 are portions of a hysteresis loop of a magnetic material.

The degree to which the form of the hysteresis loop approaches the form of a rectangle can be expressed quantatively in different ways. A common measure is, for example, the quotient $$\frac{B_r}{B_{cl}}$$

In order to explain the meaning of the said product reference is made to Fig. 1 of the accompanying drawing, which is a schematical representation of a part of a saturation-magnetisation curve. In this figure $B_r$ stands for the retartivity, $B_{cl}$ for the induction at which the hysteresis loop just closes. In practice, it is often difficult to measure $B_{cl}$ to a high degree of accuracy, but an approximately exact value for $B_{cl}$ is easily found by averaging the inductions after partial magnetisation and partial demagnetisation respectively (with saturation in the interim), both inductions being measured at the same field strength which is so chosen that the said inductions differ more than 1% but less than 3% from each other. This holds for the measurements made in carrying through the present invention. For these measurements a ballistic galvanometer was employed (Bozorth, "Ferromagnetism," page 843). In the present context, the quotient $$\frac{B_r}{B_{cl}}$$

is assumed to be measured on a ring-shaped magnetic core with a constant cross-sectional surface area of the ferromagnetic material of the ring and an outside diameter at most 1.6 times as large as the inside diameter.

The degree to which the form of the hysteresis loop approaches a rectangle is also expressible in terms of the so-called "squareness ratio" $(R_s)_{max}$. For the meaning of this factor reference is made to the aforesaid literature. To be complete a short explanation is given with reference to Fig. 2 which is likewise a schematical representation of a part of a magnetisation loop and relates to a case in which demagnetisation was commenced prior to attaining magnetic saturation. The factor $(R_s)_{max}$ is defined:

$$\left\{ \frac{B_{(-\tfrac{1}{2}H_m)}}{B_{(H_m)}} \right\}_{max}$$

The quotient $$\frac{B_{(-\tfrac{1}{2}H_m)}}{B_{(H_m)}}$$

is a function of the applied maximum field strength $H_m$. It is found that this quotient is at a maximum for a given value of $H_m$ which is usually little different from the coercive force $H_c$. This maximum value of the quotient is denoted by the symbol $(R_s)_{max}$. The measurements of $$B_{(H_m)} \text{ and } B_{(-\tfrac{1}{2}H_m)}$$

required for determining $(R_s)_{max}$, can here again be taken by means of a ballistic galvanometer. In this case also the measuring objects were ring-shaped magnetic cores with a constant cross-sectional area of the magnetic material of the ring having an outside diameter at most 1.6 times as large as its inside diameter.

In using ferromagnetic materials whereof the hysteresis loop approaches a rectangle, high-frequency alternating currents are usually concerned, and therefore Foucault currents should be reduced as much as possible. When using ferromagnetic alloys this is obtained to a degree by making up the magnetic cores from very thin layers of the ferromagnetic material, which are insulated from one another. However, it is often extremely difficult to form cores with a hysteresis loop, approaching a rectangle, from very thin layers. Hence, it is advantageous with regard to the said high frequencies, and even necessary at still higher frequencies to use magnetically soft, ferricoxide containing materials of spinel structure. As a matter of fact, these materials themselves have a very low electric conductivity.

For the serviceability of the said magnetic cores for use in magnetic memories and magnetic switches it is furthermore vital that the coercive force $(H_c)$ should be low (preferably not higher than 10 oersteds and preferably even lower than 5 oersteds) since otherwise the electromagnetic losses are too high.

In accordance with the invention it has now been found that magnetic cores whereof the hysteresis loop approaches a rectangle so as to fulfill the conditions $$\frac{B_r}{B_{cl}} > 0.7$$

and $(R_s)_{max} > 0.6$, while $H_c < 4$ oersted are obtained by making them from a material substantially consisting of at least one compound of the formula:

$$Li_xCu_{(1-2x)}Fe_{(2+x)}O_4$$

in which $x$ lies between 0.25 and 0.40, which compounds are obtained by heating a mixture of lithium, copper and iron compounds in the desired weight-ratio in a gaseous atmosphere with an oxygen content in excess of 50 volume percent at a temperature of 1100° C. to 1200° C.

Example

A mixture of lithium carbonate and iron oxide is ground for eight to ten hours in absolute alcohol or anhydrous benzene and subsequently pre-fired for one hour at 750° C. in a gas mixture containing 1 volume part of carbon dioxide to 6 volume parts of oxygen. Next to cooling, the reaction product is ground for some time, say 2 hours in absolute alcohol. With a suitable choice of the ratio of the quantities of lithium carbonate and iron oxide started with, the reaction product is a compound whereof the composition substantially corresponds to the formula $LiFe_5O_8$.

Furthermore a prefired mixture of copper oxide and iron oxide is obtained, by grinding a mixture of these materials in a ratio of 1 atom percent copper to approximately 2 atom percent iron for 10 hours in alcohol and heating it for one hour at 750° C. in an oxygen atmosphere. After cooling, the reaction product is ground for 2 hours in alcohol.

For the final reaction the compound $LiFe_5O_8$ and the pre-fired mixture of copper oxide and iron oxide, mixed in the desired weight ratio, ground for 5 hours in absolute alcohol and subsequently heated at a temperature of 1100° C. to 1200° C. in oxygen. The composition, the value of the quotient $$\frac{B_r}{B_{cl}}$$

of $(R_s)_{max}$ and of $H_c$ of several magnetic cores made up of the preparations thus obtained are stated in the following table:

| Composition | $\frac{B_r}{B_{cl}}$ | $(R_s)_{max}$ | $H_c$ in oersteds |
|---|---|---|---|
| $Li_{0.40}Cu_{0.20}Fe_{2.40}O_4$ | 0.89 | 0.70 | 2.8 |
| $Li_{0.37}Cu_{0.26}Fe_{2.37}O_4$ | 0.88 | 0.65 | 2.75 |
| $Li_{0.32}Cu_{0.36}Fe_{2.32}O_4$ | 0.88 | 0.71 | 2.45 |
| $Li_{0.30}Cu_{0.40}Fe_{2.30}O_4$ | 0.88 | 0.65 | 1.5 |
| $Li_{0.25}Cu_{0.50}Fe_{2.25}O_4$ | 0.90 | 0.75 | 1.5 |

The squareness ratio of the hysteresis loop of the magnetic cores concerned can still be improved by heating, preferably at a temperature at least as high as the Curie-temperature, followed by cooling in a magnetic field which may either be a magnetic alternating field or a magnetic direct field. It was found that magnetic cores whereof the composition corresponds to the formula $Li_{0.30}Cu_{0.40}Fe_{2.30}O_4$ thus permitted the squareness ratio of the hysteresis loop to be raised from 0.65 to 0.80.

What is claimed is:

1. A method of manufacturing a magnetic core comprising the steps of forming a mixture of $LiFe_5O_8$ and a prefired mixture of copper oxide and ferric oxide in which the atomic ratio of copper to iron is 1:2 in proportions forming upon heating a lithium copper ferrite having the formula $Li_xCu_{(1-2x)}Fe_{(2+x)}O_4$, $x$ being between 0.25 and 0.40, said ferrite having a substantially rectangular hysteresis loop in which the squareness ratio $B_r/B_{cl}$ is greater than 0.70, $(R_s)_{max}$ is greater than 0.6 and $H_c$ is less than 4 oersted, heating said mixture in an atmosphere containing more than 50% by volume of oxygen at a temperature of about 1100° C. to 1200° C. for a time sufficient to form said ferrite, and cooling said ferrite to thereby produce said core with said rectangular hysteresis loop.

2. The method of claim 1, in which the value of $(R_s)_{max}$ is increased by subsequently heating the core at least to the Curie temperature of said magnetic core and then cooling said core in a magnetic field.

3. A magnetic core having a substantially rectangular hysteresis loop and consisting essentially of a lithium-copper ferrite having the formula $Li_xCu_{(1-2x)}Fe_{(2+x)}O_4$, $x$ being between 0.25 and 0.40, said ferrite having a squareness ratio $B_r/B_{cl}$ which is greater than 0.70, an $(R_s)_{max}$ which is greater than 0.6 and a coercive force $(H_c)$ which is less than 4 oersted, said core being produced by sintering at a temperature of about 1100° C. to 1200° C. in an atmosphere containing at least 50% by volume of oxygen, a mixture of $LiFe_5O_8$ and a prefired mixture of copper oxide and ferric oxide in which the atomic ratio of Cu:Fe is 1:2 in proportions and for a time sufficient to produce said ferrite.

References Cited in the file of this patent

"Proceedings of the IRE," vol. 44, No. 10, October 1956, pages 1235 and 1305.